(12) United States Patent
Wang (10) Patent No.: US 8,773,985 B2
(45) Date of Patent: *Jul. 8, 2014

(54) METHOD AND APPARTUS FOR ADMISSION CONTROL IN A RADIO COMMUNICATIONS SYSTEM

(75) Inventor: Hongwei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 963 days.

This patent is subject to a terminal disclaimer.

(21) Appl. No.: 12/841,897

(22) Filed: Jul. 22, 2010

(65) Prior Publication Data

US 2010/0284272 A1   Nov. 11, 2010

Related U.S. Application Data

(63) Continuation of application No. PCT/CN2009/070219, filed on Jan. 20, 2009.

(30) Foreign Application Priority Data

Jan. 23, 2008 (CN) .......................... 2008 1 0065627

(51) Int. Cl.
   *H04W 74/00* (2009.01)
(52) U.S. Cl.
   USPC ........................................................ 370/230
(58) Field of Classification Search
   USPC ......................................... 370/230, 235, 252
   See application file for complete search history.

(56) References Cited

U.S. PATENT DOCUMENTS

| | | | |
|---|---|---|---|
| 2003/0199278 A1* | 10/2003 | Lee et al. ................... | 455/452.2 |
| 2005/0094560 A1 | 5/2005 | Montes | |
| 2006/0239184 A1 | 10/2006 | Moore | |
| 2007/0201366 A1 | 8/2007 | Liu | |
| 2010/0235538 A1* | 9/2010 | Charny et al. ................. | 709/235 |
| 2011/0007645 A1 | 1/2011 | Tompson et al. | |

FOREIGN PATENT DOCUMENTS

| | | |
|---|---|---|
| CN | 1728867 A | 2/2006 |
| CN | 1747400 A | 3/2006 |
| CN | 1802000 A | 7/2006 |
| CN | 1852557 A | 10/2006 |
| CN | 1968522 A | 5/2007 |

(Continued)

OTHER PUBLICATIONS

Office Action issued in corresponding Australian Patent Application No. 2009208257, mailed Jan. 14, 2013.

(Continued)

*Primary Examiner* — Donald Mills
*Assistant Examiner* — Henry Baron
(74) *Attorney, Agent, or Firm* — Brinks Gilson & Lione (57) ABSTRACT

A method for admission control in a radio communications system that includes determining a quality of service (QoS) type of a service according to a QoS property of the service, determining a service satisfaction ratio of services that belong to the determined QoS type according to a result of the determining a QoS type, comparing the determined service satisfaction ratio with an admission threshold, and admitting the service if the determined service satisfaction ratio is greater than or equal to the admission threshold. An apparatus for admission control in the radio communications system is also provided. With the embodiments in the present disclosure, the resource utilization may be accurately calculated, and the admission control algorithm may be more easily developed and maintained.

11 Claims, 3 Drawing Sheets

(56) References Cited

FOREIGN PATENT DOCUMENTS

| CN | 101052232 A | 10/2007 |
|---|---|---|
| CN | 101494877 B | 8/2012 |
| WO | WO 2004/039006 A2 | 5/2004 |
| WO | 2009/094930 A1 | 8/2009 |

OTHER PUBLICATIONS

Chinese Patent No. 101494877, issued on Aug. 22, 2012, granted in corresponding Chinese Patent Application No. 200810065627.X.

Jia-bin et al., "GoS-Based Call Admission Control Algorithm for Power Controlled WCDMA Networks" Journal of Electronics & Information Technology. vol. 27, No. 5, May 2005.

Xiao-ming et al., "Admission Control for Providing Statistical QoS in High-Speed Networks" Acta Electronica Sinica. vol. 28, No. 10, Oct. 2000.

"Series G: Transmission Systems and Media, Digital Systems and Networks" International Telecommunication Union. May 2000.

"Series P: Telephone Transmission Quality, Telephone Installations, Local Line Networks" International Telecommunication Union. Feb. 2001.

Office Action issued in corresponding Chinese Patent Application No. 20081006527.X; issued Feb. 5, 2010.

International Search Report issued in corresponding PCT Application No. PCT/CN2009/070219; mailed Apr. 30, 2009.

Written Opinion of the International Searching Authority issued in corresponding PCT Patent Application No. PCT/CN2009/070219, mailed Apr. 30, 2009.

Fu et al., "Admission Control for Providing Statistical QoS in High-Speed Networks" Acta Electronica Sinica, vol. 28 No. 10, Oct. 2000.

GoS-Based Call Admission Control Algorithm for Power Controlled WCDMA Networks Journal of Electronics & Information Technology, vol. 27 No. 5, May 2005.

Office Action issued in commonly owned U.S. Appl. No. 13/312,632, mailed Feb. 15, 2012.

Office Action issued in commonly owned U.S. Appl. No. 13/312,632, mailed Jul. 5, 2012.

Office Action issued in corresponding Australian Patent Application No. 2009208257, mailed Jun. 4, 2012.

* cited by examiner

Apparatus for admission control
FIG. 3

Apparatus for admission control
FIG. 4

Apparatus for admission control
FIG. 5

Apparatus for admission control
FIG. 6

METHOD AND APPARTUS FOR ADMISSION CONTROL IN A RADIO COMMUNICATIONS SYSTEM

CROSS REFERENCE TO RELATED APPLICATIONS

This application is a continuation of International Application No. PCT/CN2009/070219, filed on Jan. 20, 2009, which claims priority to Chinese Patent Application No. 200810065627.X, filed on Jan. 23, 2008, both of which are hereby incorporated by reference in their entireties.

FIELD OF THE DISCLOSURE

The present disclosure relates to the radio communications field, and in particular, to an admission control technology.

BACKGROUND

Among the radio resource management algorithms in a radio communications system, an admission algorithm is a basic radio resource management algorithm. An admission algorithm determines whether to allow a new service call request for establishing a connection according to the cell load condition. The cell load is a relatively abstract concept and has different meanings in radio communications system using different technologies.

In a traditional radio communications system such as the global system for mobile communications (GSM) and R99 of the wideband code division multiple access (WCDMA), "dedication" is the main idea of resource allocation. When a user accesses a system and resources are allocated to the user, the resources are occupied by the user so long as the user does not disconnect the connection. Therefore, resource utilization can be used to represent the cell load. Taking the power resource as an example, if the actual output power of a base station is more than 90% of the maximum output power, the cell load is considered high. If the actual output power of a base station is less than 90% of the maximum output power, the cell load is considered low. In addition, because the resources are dedicated, the resources may be predicted. That is, the quantity of resources occupied by a new user accessing the system may be predicted according to the current system load condition.

With the evolution of technologies, "sharing" replaces "dedication" and becomes the main trend of resource allocation. After a user accesses the system, the quantity of resources occupied by the user may be determined by a scheduling algorithm, allocated according to the actual need, and balanced according to the priority. In this case, it is improper to use the resource utilization to represent the cell load condition.

Some examples are described herein. Numerous single link enhanced technologies have been introduced in the long term evolution (LTE). For example, the adaptive code modulation algorithm may adjust the code modulation scheme on a real-time basis according to the channel quality and power requirements, multiple input multiple output (MIMO) may implement space multiplexing by using multiple antennas, and the automatic repeat request (arq) and hybrid automatic repeat request (HARQ) form a hierarchical retransmission. Under the influences of these algorithms, "sharing" becomes more and more powerful and flexible. However, the amount of resources used by the same service and even the total amount of available resources may vary to a large degree. Due to the influences of several factors, the calculation of resource utilization becomes complex and inaccurate. Thus, it is no longer proper to perform admission control on services based on the resource utilization.

SUMMARY

Embodiments of the present disclosure provide a method and an apparatus for admission control in a radio communications system to avoid complex and inaccurate calculations of resource utilization. In addition, the method and apparatus may be easily developed and maintained.

A method for admission control in a radio communications system includes determining a quality of service (QoS) type of a service according to a QoS property of the service, determining a service satisfaction ratio of services that belong to the determined QoS type according to a result of the determining the QoS type, comparing the determined service satisfaction ratio with an admission threshold, and admitting the service if the determined service satisfaction ratio is greater than or equal to the admission threshold.

An apparatus for admission control in the radio communications system includes a determination unit configured to determine a quality of service (QoS) type of a service that initiates a call request according to a QoS property of the service and an admission control unit configured to determine a service satisfaction ratio of services that belong to the determined QoS type according to a result of the determination unit, compare the determined service satisfaction ratio with an admission threshold, and admit the service if the service satisfaction ratio is greater than or equal to the admission threshold.

By using the method and apparatus provided in embodiments of the present disclosure, service admission control is performed according to the service satisfaction ratio of different QoS types of services. Thus, complex and inaccurate calculations of resource utilization are avoided, which complies with the end-to-end QoS guarantee concept, and the parameter configuration is simplified. In addition, the admission control algorithm provided in embodiments of the present disclosure may be independent of lower layer algorithms (e.g., power control algorithm and scheduling algorithm), so that any change of the lower layer algorithms will not affect the implementation of the admission control algorithm in the embodiments of the present disclosure. Thus, the admission control algorithm may be easily developed and maintained. In addition, complex and inaccurate predications may be avoided, and the network performance may be better monitored. Further, the admission control algorithm is more persuasive for the operators.

BRIEF DESCRIPTION OF THE DRAWINGS

To make the technical solution under the present disclosure clearer, the accompanying drawings for illustrating the embodiments of the present disclosure or the prior art are outlined below. Apparently, the accompanying drawings are exemplary only, and those skilled in the art can derive other drawings from such accompanying drawings without any creative effort.

DETAILED DESCRIPTION OF THE EMBODIMENTS

The following detailed descriptions are directed to the technical solutions of embodiments of the present disclosure with reference to the accompanying drawings of the embodiments. However, the embodiments to be described are only part of, rather than all of, the embodiments of the present disclosure. Those skilled in the art can derive other embodiments from the embodiments given herein without making any creative effort, and all such embodiments are covered in the protection scope of the present disclosure.

Figure 1:
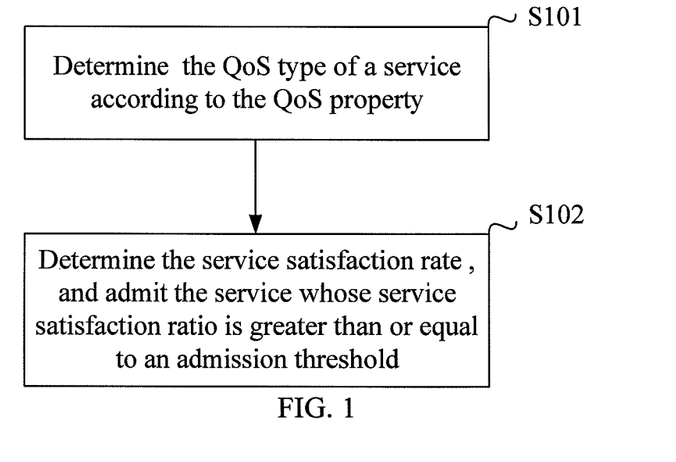
FIG. 1 is a flowchart of a method for admission control in a radio communications system in an embodiment of the present disclosure.

FIG. 1 is a flowchart of a method for admission control in a radio communications system according to an embodiment of the present disclosure. The method includes the following steps.

S101: Determine the QoS type of a service.

The QoS type of the service that initiates a call request is determined according to the QoS property of the service.

S102: Determine the service satisfaction ratio of services that belong to the determined QoS type and admit the service whose service satisfaction ratio is greater than or equal to an admission threshold.

The service satisfaction ratio of services that belong to the QoS type is determined according to the determination result in S101. The determined service satisfaction ratio is compared with a preset admission threshold. The service whose service satisfaction ratio is greater than or equal to the admission threshold are admitted. Thus, complex and inaccurate calculations of resource utilization are avoided which complies with the end-to-end QoS guarantee concept, and the network performance can be enhanced.

All supported services in the radio communications system are classified into different types according to the QoS properties of the services. The types are known as QoS types. For example, there may be five types of services, namely, voice service, streaming service, high delay sensitive interactive service, guaranteed bit rate (GBR) service, and best effort service. The methodology for calculating the service satisfaction ratio for different QoS types is described below. There exists a plurality of methods that may be utilized to calculate the service satisfaction ratio for each QoS type. Examples are as follows.

1. Voice Service

The voice quality of the voice services may be represented by a mean opinion score (MOS). For example, the perceptual evaluation of speech quality (PESQ) method specified by the ITU-T P.862 and the E-Model specified by the ITU-T G.107 in the prior art can perform such an operation.

For the voice services, the following methods may be used to calculate the service satisfaction ratio.

(1) If the MOS of a voice service exceeds a preset score, the voice service is regarded as satisfactory (i.e., satisfying). If the MOS of a voice service does not exceed a preset score, the voice service is regarded as unsatisfactory (i.e., unsatisfying). The preset score may be determined according to the actual need. Thus, the service satisfaction ratio of voice services may be calculated by the following formula. That is, the service satisfaction ratio of the voice services is the ratio of the number of satisfying voice services to the total number of voice services.

Service satisfaction ratio of the voice service=(Number of satisfying voice services)/(Total number of voice services)

(2) A sum of weighted MOSs of each voice service may be obtained according to the weight of each voice service. In this way, the service satisfaction ratio of the voice service is the ratio of the sum of weighted MOSs of each voice service to the sum of weights of all voice services. For example, the formula may be as follows:

$$S_{voice} = \frac{\sum (W_i \times MOS_i)}{\sum W_i}$$

In this formula, $S_{voice}$ indicates the service satisfaction ratio of the voice service, $MOS_i$ indicates the MOS of the $i^{th}$ voice service, and $W_i$ indicates the weight of the $i^{th}$ voice service.

(3) The user equipment (UE) reports whether the UE is satisfied with the current voice service. Then, the service satisfaction ratio of the voice service is calculated according to the report of the UE. The report of the UE may include a parameter indicating whether a voice service is satisfying. In this way, the service satisfaction ratio of the voice services is the ratio of the number of satisfying voice services to the total number of voice service users. The formula may be as follows:

Service satisfaction ratio of the voice service=(Number of satisfying voice services)/(Total number of voice service users)

2. Streaming Service

Generally, the streaming services are video streaming services. Other streaming services may be processed in similar ways. In the prior art, the peak signal to noise ratio (PSNR) is generally used to evaluate the quality of the streaming services. For the streaming service, the following methods may be used to calculate the service satisfaction ratio.

(1) If the PSNR reaches a preset numeric value, a streaming service is regarded as satisfying. If the PSNR does not reach a preset value, the streaming service is regarded as unsatisfying. Thus, the service satisfaction ratio of the streaming service is the ratio of the number of satisfying streaming services to the total number of streaming services. For example, Service satisfaction ratio of the streaming service= (Number of satisfying streaming services)/(Total number of streaming services)

The preset numeric value may be determined according to the actual need.

(2) A sum of weighted PSNRs of each streaming service may be determined according to the weight of each streaming service. In this way, the service satisfaction ratio of the streaming service is the ratio of the sum of weighted PSNRs of each streaming service to the sum of weights of all streaming services. For example, the formula may be as follows:

$$S_{video} = \frac{\sum (W_i \times PSNR_i)}{\sum W_i}$$

In this formula, $S_{video}$ indicates the service satisfaction ratio of the streaming service, $PSNR_i$ indicates the PSNR of the $i^{th}$ streaming service, and $W_i$ indicates the weight of the $i^{th}$ streaming service.

(3) The UE reports whether the UE is satisfied with the current streaming service. Then, the service satisfaction ratio of streaming services is calculated according to the report of the UE. The report of the UE may include a parameter indicating whether a streaming service is satisfying. In this way, the service satisfaction ratio of the streaming service is the ratio of the number of satisfying streaming services to the total number of streaming service users. The formula may be as follows:

Service satisfaction ratio of the streaming service= (Number of satisfying streaming services)/(Total number of streaming service users)

3. High Delay Sensitive Interactive Service

For the high delay sensitive interactive services, the following methods may be used to calculate the service satisfaction ratio.

(1) The high delay sensitive interactive services have high requirements for the delay, and the network also has time requirements for buffering the data packets of these services. If a data packet is not transmitted correctly within a specified time, the data packet may be dropped and not retransmitted. The system may monitor a packet loss of a high delay sensitive interactive service. If the number of times of packet losses exceeds K within a specified time period T before the admission judgment time, where the packet loss is due to timeout, the high delay sensitive interactive service is regarded as unsatisfying. If the number of times of packet losses does not exceed K within a specified time period T before the admission judgment time, the high delay sensitive interactive service is regarded as satisfying. T and K may be set according to the delay tolerance of the actual services. In this way, the service satisfaction ratio of the high delay sensitive interactive service is the ratio of the number of satisfying high delay sensitive interactive services to the total number of high delay sensitive interactive services. The formula may be as follows:

Service satisfaction ratio of the high delay sensitive interactive service=(Number of satisfying high delay sensitive interactive services)/(Total number of high delay sensitive interactive services)

(2) The UE reports whether the UE is satisfied with the current high delay sensitive interactive service. Then, the service satisfaction ratio of the high delay sensitive interactive service is calculated according to the report of the UE. The report of the UE may include a parameter indicating whether a high delay sensitive interactive service is satisfying. In this way, the service satisfaction ratio of the high delay sensitive interactive service is the ratio of the number of satisfying high delay sensitive interactive services to the total number of high delay sensitive interactive service users. The formula may be as follows:

Service satisfaction ratio of the high delay sensitive interactive service=(Number of satisfying high delay sensitive interactive services)/(Total number of high delay sensitive interactive service users)

4. GBR Service

Each GBR service has a GBR property, namely, a bit rate that must be guaranteed. Thus, each service with a GBR property is also called a GBR service. For the GBR services, the following methods may be used to calculate the service satisfaction ratio.

(1) The service satisfaction ratio of the GBR service is determined according to the weighted average of service dissatisfaction ratio of GBR services. For example, $$S_{GBR} = 100\% - \frac{\sum \left( W_i \times \frac{D_i}{GBR_i} \right)}{\sum W_i}$$

In this formula, $S_{GBR}$ indicates the service satisfaction ratio of the GBR service (in percentage), $D_i$ indicates the GBR difference of non-empty GBR services in the $i^{th}$ buffer queue, $GBR_i$ indicates the GBR of the $i^{th}$ GBR service, and $W_i$ indicates the weights of non-empty GBR services in the $i^{th}$ buffer queue. In this method, service dissatisfaction ratio (i.e., the ratio of the GBR difference to the GBR) of each GBR service that has data to be transmitted is calculated. Then the weighted average of service dissatisfaction ratio of GBR services is obtained. Then the service satisfaction ratio of the GBR services is obtained.

$D_i$ can be calculated by using the following formula:

$$D_i = \begin{cases} 0, & R_i \geq GBR_i \\ GBR_i - R_i, & R_i < GBR_i \end{cases}$$

In this formula, $R_i$ indicates the throughput rate of the $i^{th}$ GBR service measured within a period of time. That is, when the throughput rate of a GBR service measured within a period of time is greater than or equal to the GBR, the GBR service is regarded as satisfying, and the GBR difference is 0. When the throughput rate of a GBR service measured within a period of time is smaller than the GBR, the GBR difference is obtained according to the method provided in embodiments of the present disclosure.

(2) If the throughput rate of a GBR service within a period of time is greater than or equal to the GBR, the GBR service is regarded as satisfying. If the throughput rate of the GBR services within a period of time is smaller than the GBR, the GBR service is regarded as unsatisfying. Thus, the service satisfaction ratio of the GBR service is the ratio of the number of satisfying GBR services to the total number of GBR services. The formula may be as follows:

Service satisfaction ratio of the GBR service=(Number of satisfying GBR services)/(Total number of GBR services)

(3) The UE reports whether the UE is satisfied with the current GBR service. Then, the service satisfaction ratio of the GBR service is calculated according to the report of the UE. The report of the UE may include a parameter indicating whether a GBR service is satisfying. In this way, the service satisfaction ratio of the GBR service is the ratio of the number of satisfying GBR services to the total number of GBR service users. The formula may be as follows:

Service satisfaction ratio of the GBR service=(Number of satisfying GBR services)/(Total number of GBR service users)

5. Best Effort Service

A best effort service is the service which may obtain service when there are idle resources in the system. The best effort service has no delay requirement and GBR requirement. For the convenience of quality evaluation, a minimum bit rate (MinBR) is used, and the MinBR≠0. The MinBR means that at least the MinBR is provided for each best effort service when all the best effort services have data to be transmitted. In this case, a best effort service is satisfying. For the best effort services, the following methods may be used to calculate the service satisfaction ratio.

(1) When the average rate of all the best effort services with data transmission requirements exceeds the MinBR, the service satisfaction ratio is 100%. When the average rate of all the best effort services with data transmission requirements does not exceed the MinBR, the service satisfaction ratio is the ratio of the average rate to the MinBR. The service satisfaction ratio of the best effort service may be obtained by using the following formula:

$$S_{Non\text{-}GBR} \begin{cases} 100\%, \sum R_i \geq \text{MinBR} \times \text{Sum}_{Non\text{-}GBR} \\ \dfrac{\sum R_i}{\text{MinBR} \times \text{Sum}_{Non\text{-}GBR}}, \sum R_i < \text{MinBR} \times \text{Sum}_{Non\text{-}GBR} \end{cases}$$

In this formula, $S_{Non\text{-}GBR}$ indicates the service satisfaction ratio of the best effort service, $R_i$ indicates the throughput rate of non-empty best effort services in the $i^{th}$ buffer queue measured within a period of time, and $S_{Non\text{-}GBR}$ indicates the total number of non-empty best effort services in a buffer queue.

(2) If the throughput rate of a best effort service is greater than or equal to the MinBR within a period of time, the best effort service is satisfying. If the throughput rate of a best effort service is smaller than the MinBR within a period of time, the best effort service is unsatisfying. In this way, the service satisfaction ratio of the best effort services is the ratio of the number of satisfying best effort services to the total number of best effort services. The formula may be as follows:

Service satisfaction ratio of the best effort service=
(Number of satisfying best effort services)/(Total number of best effort services)

(3) The UE reports whether the UE is satisfied with the current best effort service. Then, the service satisfaction ratio of the best effort service is calculated according to the report of the UE. The report of the UE may include a parameter indicating whether a best effort services is satisfying. In this way, the service satisfaction ratio of the best effort services is the ratio of the number of satisfying best effort services to the total number of best effort service users. The formula may be as follows:

Service satisfaction ratio of the best effort service=
(Number of satisfying best effort services)/(Total number of best effort service users)

Figure 2:
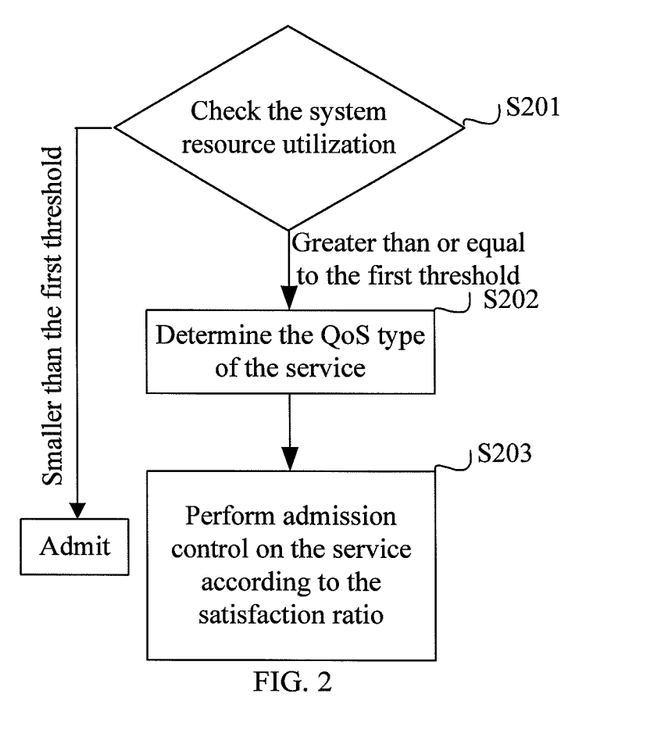
FIG. 2 is a flowchart of a method for admission control in the radio communications system in another embodiment of the present disclosure.

FIG. 2 is a flowchart of a method for admission control in the radio communications system in another embodiment of the present disclosure.

S201: Check system resource utilization.

For example, when a new service or a handover service initiates a call request, the system resource utilization is first checked. The system resource utilization may be roughly calculated in the case of low accuracy requirements or accurately calculated in the case of high accuracy requirements. The admission judgment is performed according to the check result. If the system resource utilization is smaller than a preset first threshold, the current resource utilization is low and the new service or the handover service can be directly admitted. If the system resource utilization is greater than or equal to the preset first threshold, S202 is executed.

It should be noted that step S201 is not mandatory. That is, step S201 is optional and may be omitted, and the admission control process can starts directly from step S202. When there are only few users in the system and these users are not satisfied due to poor quality of the channel, step S201 may be executed to avoid service rejection due to a too low service satisfaction ratio.

S202: Determine the QoS type of the service.

In this step, when a new service or a handover service initiates a call request, the QoS type of the new service or the handover service may be determined according to a previous classification result. As mentioned above, all the services supported in the radio communications system may be classified into five types according to the QoS properties of the services, namely, voice service, streaming service, high delay sensitive interactive service, GBR service, and best effort service. The QoS types of services may be stored in a table or a list or other forms. In this embodiment, the QoS type is regarded as a parameter and represented by a mapping table. Because the QoS property is carried in the service request initiated by the user, the QoS type of the service may be determined directly according to the mapping table.

S203: Perform admission control on the service according to the service satisfaction ratio of services that belong to the determined QoS type.

The service satisfaction ratio is determined according to the determination result in step S202. The service satisfaction ratio may be calculated with reference to the description mentioned in the embodiment which is illustrated by FIG. 1. For example, if it is determined that the QoS type of the new service or the handover service is voice service in step S202, any of the preceding calculation methods may be selected to determine the service satisfaction ratio of the voice service. The determined service satisfaction ratio is then compared with a preset admission threshold. If the service satisfaction ratio is greater than or equal to the preset admission threshold, the service is admitted. If the service satisfaction ratio is lower than the preset admission threshold, the service is rejected.

For the new service and the handover service, the same or different admission thresholds may be adopted. For example, the admission threshold of the handover service may be set to be lower than the admission threshold of the new service. That is, for the services of the same QoS type, there may be a scenario where the handover service is admitted but the new service is rejected. In this way, the handover service may be preferably admitted.

In addition, different admission thresholds may be used for services with different priorities. For example, the admission threshold of a gold user (having a high priority) may be set to be lower than that of a copper user (having a low priority). That is, for the services of the same QoS type, there may be a scenario where the gold service is admitted but the copper service is rejected. In this way, it can be guaranteed that services with higher priorities may be easily admitted, so that services may be differentiated according to different priorities.

Now the process of admission control on the new service or handover service is completed. From the perspective of compatibility, a resource limitation indication may also be received from other modules during the admission control on the basis of preceding embodiments. When a resource limitation indication (e.g., a license limitation indication) is received, the new service or handover service may not be admitted even if the service satisfaction ratio is 100%.

The admission control method in this embodiment is applicable to the radio communications system using a sharing technology such as LTE, high speed packet access (HSPA+) of the WCDMA, worldwide interoperability for microwave access (WiMAX), and ultra mobile broadband (UMB) systems.

By using the method for admission control in the radio communications system in this embodiment, admission control is performed on the new service or handover service according to the service satisfaction ratio of services that belong to different QoS types. Thus, complex and inaccurate calculations of resource utilization are avoided which complies with the end-to-end QoS guarantee concept, and the parameter configuration is simplified. In addition, the admission control algorithm may be independent of lower layer algorithms (e.g., power control and scheduling algorithms), and any change of the lower layer algorithms may not affect the implementation of the admission control algorithm, thereby simplifying the development and maintenance of the admission control algorithm. Further, the complex and inaccurate predications are avoided, and the network performance may be better monitored, which makes the admission control algorithm more pervasive for the operators.

Figure 3:
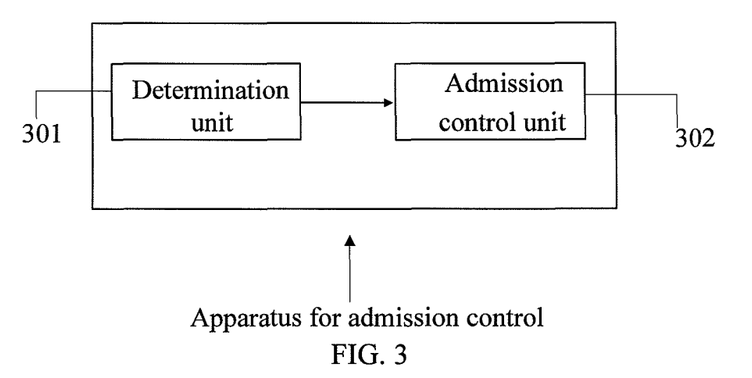
FIG. 3 shows a structure of an apparatus for admission control in the radio communications system in an embodiment of the present disclosure.

FIG. 3 illustrates a structure of an apparatus for admission control in a radio communications system in an embodiment of the present disclosure. The apparatus may include a determination unit 301 and an admission control unit 302.

The determination unit 301 is configured to determine the QoS type of a service that initiates a call request according to the QoS property of the service.

The admission control unit 302 is configured to determine the service satisfaction ratio of services that belong to the determined QoS type according to a determination result of the determination unit 301, compare the service satisfaction ratio of services with an admission threshold, and perform admission control according to the comparison result. The service whose service satisfaction ratio is greater than or equal to the admission threshold is admitted.

Figure 4:
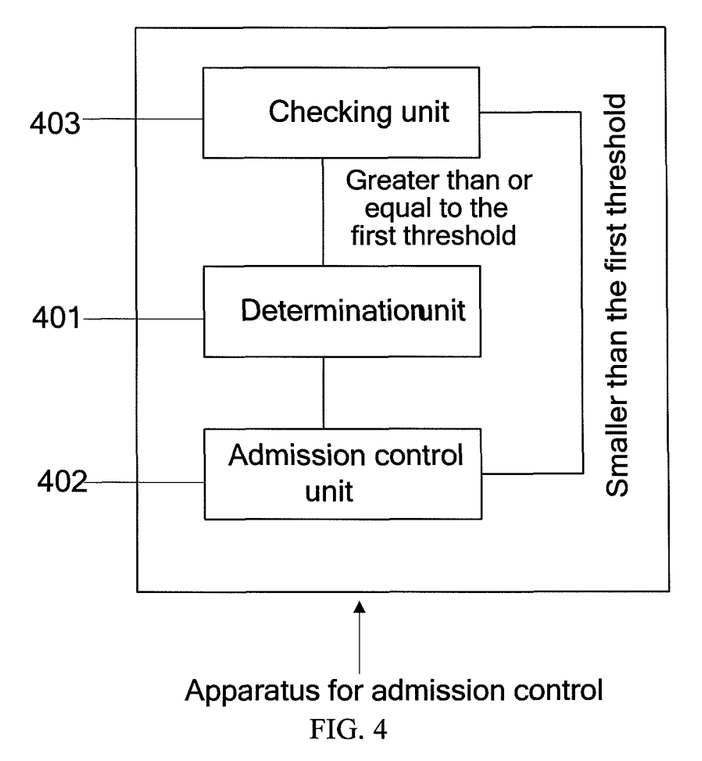
FIG. 4 shows a structure of an apparatus for admission control in the radio communications system in another embodiment of the present disclosure.

Further, to avoid service rejection in a scenario where there are only few users in the system and these users are unsatisfied due to the poor quality of the channel, an apparatus for admission control is provided in another embodiment of the present disclosure. As shown in FIG. 4, the apparatus may include a determination unit 401, an admission control unit 402, and a checking unit 403.

The determination unit 401 is configured to determine the QoS type of a service that initiates a call request according to the QoS property of the service.

The admission control unit 402 is configured to determine the service satisfaction ratio of services that belong to the determined QoS type according to the determination result of the determination unit 401, compare the service satisfaction ratio with an admission threshold, and perform admission control according to the comparison result. The service whose service satisfaction ratio is greater than or equal to the admission threshold is admitted.

The checking unit 403 is configured to check the system resource utilization.

When the checking unit 403 finds that the system resource utilization is smaller than a preset first threshold, the admission control unit 402 admits the service directly. When the checking unit 403 finds that the system resource utilization is greater than or equal to the preset first threshold, the determination unit 401 and the admission control unit 402 may be activated to perform admission control on the service that initiates the call request.

Figure 5:
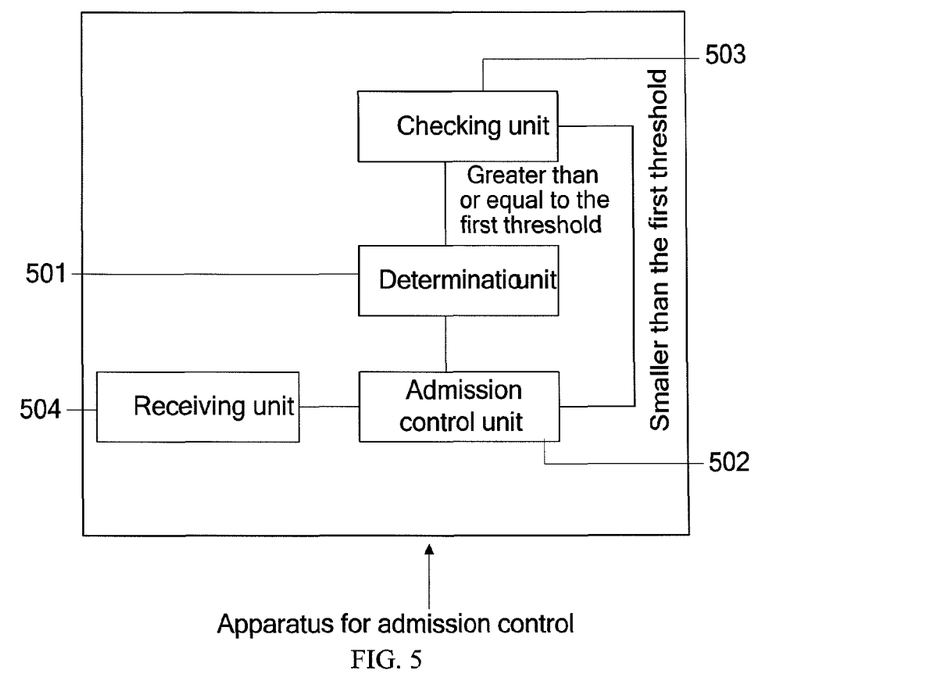
FIG. 5 shows a structure of an apparatus for admission control in the radio communications system in another embodiment of the present disclosure.

Additionally, considering the system compatibility, another embodiment provides an apparatus for admission control. As shown in FIG. 5, the apparatus may include a determination unit 501, an admission control unit 502, a checking unit 503, and a receiving unit 504.

The determination unit 501 is configured to determine the QoS type of a service that initiates a call request according to the QoS property of the service.

The admission control unit 502 is configured to determine the service satisfaction ratio of services that belong to the determined QoS type according to the determination result of the determination unit 501, compare the service satisfaction ratio with an admission threshold, and perform admission control according to the comparison result. The service whose service satisfaction ratio is greater than or equal to the admission threshold is admitted.

The checking unit 503 is configured to check the system resource utilization. When the checking unit 503 finds that the system resource utilization is smaller than the preset first threshold, the admission control unit 502 admits the service directly. When the checking unit 503 finds that the system resource utilization is greater than or equal to the preset first threshold, the determination unit 501 and the admission control unit 502 may be activated to perform admission control on the service that initiates the call request.

The receiving unit 504 is configured to receive a resource limitation indication.

When the receiving unit 504 receives a resource limitation indication, for example, a license limitation indication, the new service or the handover service cannot be admitted even if the service satisfaction ratio is 100%. That is, the admission control unit 502 rejects the service directly.

Figure 6:
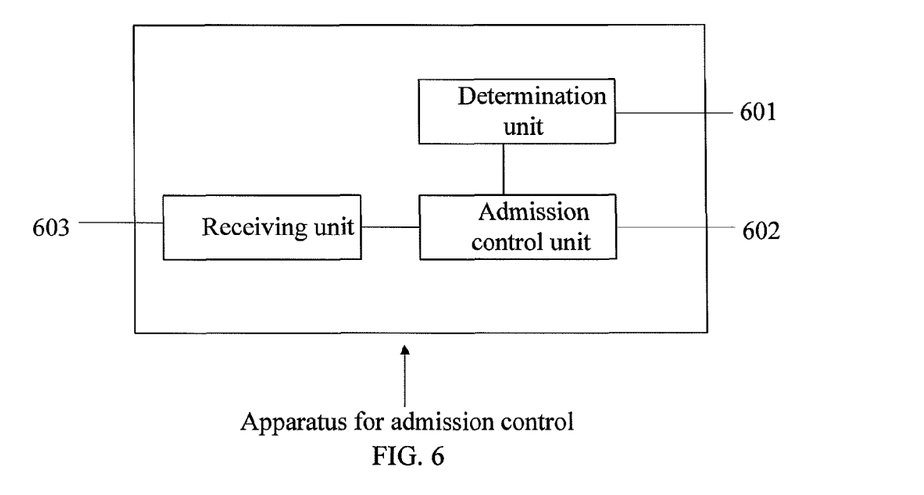
FIG. 6 shows a structure of an apparatus for admission control in the radio communications system in another embodiment of the present disclosure.

It should be noted that in this embodiment, the apparatus may not include the checking unit 503, that is, the checking unit 503 is optional. As shown in FIG. 6, the apparatus for admission control provided in another embodiment of the present disclosure may include a determination unit 601, an admission control unit 602, and a checking unit 603.

The determination unit 601 is configured to determine the QoS type of a service that initiates a call request according to the QoS property of the service.

The admission control unit 602 is configured to determine the service satisfaction ratio of services that belong to the determined QoS type according to the determination result of the determination unit 601, compare the service satisfaction ratio with an admission threshold, and perform admission control according to the comparison result. The service whose service satisfaction ratio is greater than or equal to the admission threshold is admitted.

The receiving unit 603 is configured to receive a resource limitation indication.

When the receiving unit 603 receives the resource limitation indication, for example, a license limitation indication, the new service or the handover service cannot be admitted even if the service satisfaction ratio is 100%. That is, the admission control unit 602 rejects the service directly.

The preceding apparatus for admission control may be set in a Radio Resource Management (RRM) entity, and the resource limitation indication is generally sent from other modules of the RRM entity, for example, a resource allocating module.

By using the method and apparatus for admission control in embodiments of the present disclosure, admission control is performed on the new service or handover service according to the service satisfaction ratio of different QoS types. Thus, complex and inaccurate calculations of resource utilization are avoided, which complies with the end-to-end QoS guarantee concept, and the parameter configuration is simplified. In addition, the admission control algorithm may be independent of lower layer algorithms (for example, power control and scheduling algorithms), and any change of the lower layer algorithms may not affect the implementation of the admission control algorithm, thereby simplifying the development and maintenance of the admission control algorithm. Further, the complex and inaccurate predications are avoided, and the network performance may be better monitored, which makes the admission control algorithm more pervasive for the operators.

It is understandable to those skilled in the art that all or part of the steps in the preceding embodiments may be implemented by related hardware (e.g., a processor) instructed by a program such as a computer program. The program may be stored in a readable storage medium such as a non-transitory computer readable storage medium. When the program runs, the following steps of the method are executed: determining the QoS type of a service, determining the service satisfaction ratio of services that belong to the determined QoS type, and admitting service whose service satisfaction ratio is greater than or equal to the admission threshold; or checking system resource utilization, determining the QoS type of a service, and performing admission control on the service according to the service satisfaction ratio of services that belong to the determined QoS type.

In addition, a resource limitation indication may be received from other modules. When a resource limitation indication (for example, a license limitation indication) is received, the new service or handover service may not be admitted even if the service satisfaction ratio is 100%. The readable medium may be a read-only memory/random access memory (ROM/RAM), a magnetic disk, or a compact disk.

Various modifications and variations can be made to the disclosure without departing from the spirit and scope of the disclosure by those skilled in the art. Therefore, the disclosure is intended to cover all these modifications and variations provided that they fall within the scope of the claims appended to the disclosure and their equivalents.

What is claimed is:

1. A method for admission control in a radio communications system, comprising:
   in response to an admission request from a service, determining a quality of service (QoS) type of the service according to a QoS property of the service;
   determining a service satisfaction ratio of previously admitted services, wherein the previously admitted services belong to the determined QoS type according to a result of the determining the QoS type; and
   comparing the service satisfaction ratio of the previously admitted services with an admission threshold; and
   admitting the service if the determined service satisfaction ratio is greater than or equal to the admission threshold, wherein when the QoS type of the service is a voice service, the step of determining the service satisfaction ratio comprises:
   determining that the service satisfaction ratio of voice service is a ratio of a sum of weighted MOS of each voice service to a sum of weights of all voice services, wherein the sum of weighted MOS of each voice service is determined according to a weight of each voice service.

2. A method for admission control in a radio communications system, comprising:
   in response to an admission request from a service, determining a quality of service (QoS) type of the service according to a QoS property of the service;
   determining a service satisfaction ratio of previously admitted services, wherein the previously admitted services belong to the determined QoS type according to a result of the determining the QoS type; and
   comparing the service satisfaction ratio of the previously admitted services with an admission threshold; and
   admitting the service if the determined service satisfaction ratio is greater than or equal to the admission threshold, wherein when the QoS type of the service is a voice service, the step of determining the service satisfaction ratio comprises:
   calculating the service satisfaction ratio according to a report from a user equipment (UE), the report including a parameter indicating whether a voice service is satisfying, where the service satisfaction ratio of voice service is a ratio of the number of satisfying voice services to the total number of voice service users.

3. A method for admission control in a radio communications system, comprising:
   in response to an admission request from a service, determining a quality of service (QoS) type of the service according to a QoS property of the service;
   determining a service satisfaction ratio of previously admitted services, wherein the previously admitted services belong to the determined QoS type according to a result of the determining the QoS type; and
   comparing the service satisfaction ratio of the previously admitted services with an admission threshold; and
   admitting the service if the determined service satisfaction ratio is greater than or equal to the admission threshold, wherein when the QoS type of the service is a streaming service, the step of determining the service satisfaction ratio comprises:
   determining that the service satisfaction ratio of streaming service is calculating a ratio of the number of satisfying streaming services to the total number of streaming services, wherein a service whose peak signal to noise ratio (PSNR) reaches a preset numeric value is determined as a satisfying streaming service.

4. A method for admission control in a radio communications system, comprising:
   in response to an admission request from a service, determining a quality of service (QoS) type of the service according to a QoS property of the service;
   determining a service satisfaction ratio of previously admitted services, wherein the previously admitted services belong to the determined QoS type according to a result of the determining the QoS type; and
   comparing the service satisfaction ratio of the previously admitted services with an admission threshold; and
   admitting the service if the determined service satisfaction ratio is greater than or equal to the admission threshold, wherein when the QoS type of the service is a streaming service, the step of determining the service satisfaction ratio comprises:
   determining that the service satisfaction ratio of streaming service is a ratio of a sum of weighted PSNR of each streaming service to a sum of weights of all streaming services, wherein the sum of weighted PSNR of each streaming service is determined according to a weight of each streaming service.

5. A method for admission control in a radio communications system, comprising:

in response to an admission request from a service, determining a quality of service (QoS) type of the service according to a QoS property of the service;

determining a service satisfaction ratio of previously admitted services, wherein the previously admitted services belong to the determined QoS type according to a result of the determining the QoS type; and comparing the service satisfaction ratio of the previously admitted services with an admission threshold; and admitting the service if the determined service satisfaction ratio is greater than or equal to the admission threshold, wherein when the QoS type of the service is a streaming service, the step of determining the service satisfaction ratio comprises:

calculating the service satisfaction ratio according to a report from a user equipment (UE), wherein the report includes a parameter indicating whether a streaming service is satisfying, and the service satisfaction ratio of streaming service is a ratio of the number of satisfying streaming services to the total number of streaming service users.

6. A method for admission control in a radio communications system, comprising:

in response to an admission request from a service, determining a quality of service (QoS) type of the service according to a QoS property of the service;

determining a service satisfaction ratio of previously admitted services, wherein the previously admitted services belong to the determined QoS type according to a result of the determining the QoS type; and comparing the service satisfaction ratio of the previously admitted services with an admission threshold; and admitting the service if the determined service satisfaction ratio is greater than or equal to the admission threshold, wherein the service is a new service or a handover service and, wherein the admission threshold of the handover service is smaller than that of the new service.

7. The method of claim 6, before the step of determining the QoS type, the method further comprising:

checking system resource utilization, wherein when the system resource utilization is smaller than a first threshold, admitting the service that initiates the call request directly and when the system resource utilization is greater than or equal to the first threshold, turning to the step of determining the QoS type and admitting the service according to the determined service satisfaction ratio.

8. The method of claim 6, the method further comprising:
rejecting the service if a resource limitation indication is received.

9. An apparatus for admission control in a radio communications system, comprising:

a determination unit configured to determine a quality of service (QoS) type of a service that initiates a call request according to a QoS property of the service; and an admission control unit configured to determine a service satisfaction ratio of previously admitted services that belong to the determined QoS type according to a result of the determination unit, compare the determined service satisfaction ratio with an admission threshold, and admit the service if the service satisfaction ratio is greater than or equal to the admission threshold, wherein the apparatus further comprises:

a checking unit configured to check system resource utilization; and when the checking unit finds that the system resource utilization is smaller than a first threshold, the admission control unit admits the service directly and when the checking unit finds that the system resource utilization is greater than or equal to the first threshold, the determination unit and the admission control unit are activated to perform admission control on the service.

10. The apparatus of claim 9, the apparatus further comprising:

a receiving unit, configured to receive a resource limitation indication; and if the receiving unit receives the resource limitation indication, the admission control unit rejects the service.

11. The apparatus of claim 9, wherein the apparatus is set in a radio resource management entity.

* * * * *